US012321439B2

(12) United States Patent
Dantuluri et al.

(10) Patent No.: US 12,321,439 B2
(45) Date of Patent: Jun. 3, 2025

(54) REAL-TIME CROSS-CHANNEL REVERSE AUTHENTICATION

(71) Applicant: Bank of America Corporation, Charlotte, NC (US)

(72) Inventors: Indradeep Dantuluri, Harrisburg, NC (US); Pavan Chayanam, Alamo, CA (US)

(73) Assignee: Bank of America Corporation, Charlotte, NC (US)

( * ) Notice: Subject to any disclaimer, the term of this patent is extended or adjusted under 35 U.S.C. 154(b) by 254 days.

(21) Appl. No.: 18/099,208

(22) Filed: Jan. 19, 2023

(65) Prior Publication Data

US 2024/0248977 A1   Jul. 25, 2024

(51) Int. Cl.
*G06F 21/42* (2013.01)
(52) U.S. Cl.
CPC .................................... *G06F 21/42* (2013.01)
(58) Field of Classification Search
CPC ...................................................... G06F 21/42
See application file for complete search history.

(56) References Cited

U.S. PATENT DOCUMENTS

| | | | |
|---|---|---|---|
| 10,015,317 B1 * | 7/2018 | Crouthamel | H04M 3/5183 |
| 11,178,034 B1 * | 11/2021 | Joshi | H04L 43/091 |
| 2011/0202905 A1 * | 8/2011 | Mahajan | G06F 8/71 717/140 |
| 2021/0021649 A1 * | 1/2021 | Rathod | H04L 65/1076 |

* cited by examiner

*Primary Examiner* — Mohammad W Reza
(74) *Attorney, Agent, or Firm* — Weiss & Arons LLP

(57) ABSTRACT

Systems, methods, and apparatus are provided for reverse authentication across communication channel technologies. An enterprise call application may publish an event associated with an active call to a real-time monitoring application. Each event may include an agent identifier and a customer identifier. The real-time monitoring application may maintain an event queue for the active call. The event queue may be associated with the customer identifier. A web services application may interface between the central server and a mobile device. The webs services application may subscribe to the event queue at the real-time monitoring application and push a call status to a mobile device application. The mobile device application may display the call status and the agent identifier at the mobile device application.

20 Claims, 7 Drawing Sheets

REAL-TIME CROSS-CHANNEL REVERSE AUTHENTICATION

FIELD OF TECHNOLOGY

Aspects of the disclosure relate to mobile applications for use with mobile devices.

BACKGROUND OF THE DISCLOSURE

An enterprise customer may communicate with the enterprise through a variety of channels. For example, a customer may communicate by telephone or chat through a mobile application. Each medium may be protected with different modes of security.

For example, telephone-based fraud activity has become commonplace, with bad actors posing as representatives of legitimate financial institutions. Mobile device applications, on the other hand, are typically highly secured, often with both password and biometric verification. However, customer-facing mobile applications typically use different protocols and technologies from telephone systems.

An omnichannel approach may enable an enterprise to provide an integrated experience across multiple channels. It would be desirable to leverage the security features of a mobile application for reverse authentication during an active telephone call. It would be desirable to integrate enterprise customer-facing telephone applications with customer-facing mobile device applications in real-time.

SUMMARY OF THE DISCLOSURE

Systems, methods, and apparatus are provided for reverse authentication across communication channel technologies.

An enterprise call application may publish an event associated with an active call to a real-time monitoring application. Each event may include an agent identifier and a customer identifier.

A real-time monitoring application may maintain an event queue for the active call. The event queue may be associated with the customer identifier.

A web services application may interface between an enterprise central server and a customer mobile device. The web services application may subscribe to the event queue at the real-time monitoring application and push a call status to a mobile device application. The mobile device application may display the call status and the agent identifier.

The invention is a practical application that integrates telephone system technologies with a mobile device application. System architecture may manage interfaces between back-end and front-end applications to access events in real-time. A secure mobile application may display active call information including an agent name and department for reverse authentication of the agent during a concurrent telephone call.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
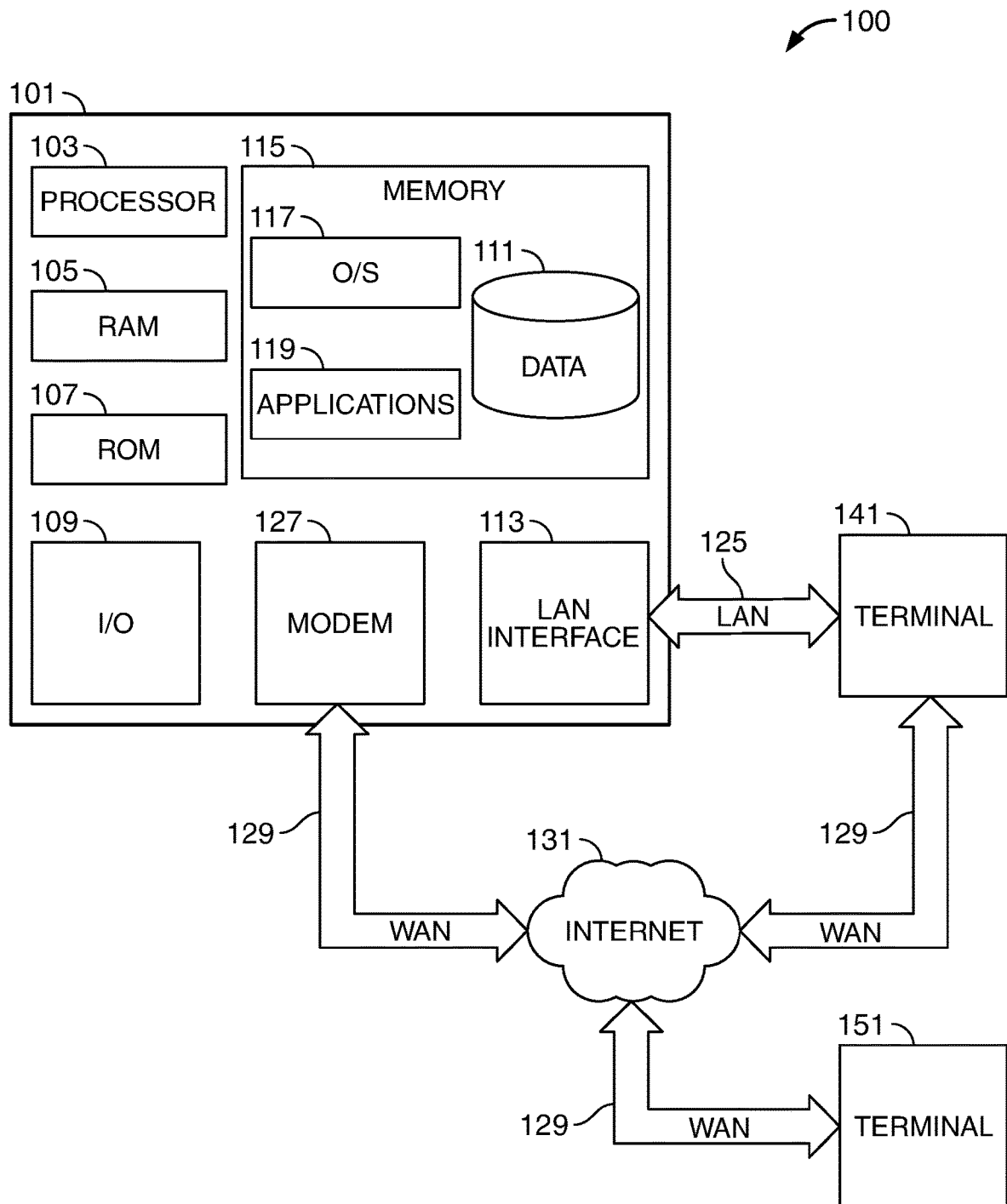
FIG. 1 shows illustrative apparatus in accordance with principles of the disclosure.

Systems, methods, and apparatus are provided for reverse authentication across communication channel technologies.

For the sake of illustration, the invention will be described as being performed by a "system." The system may include one or more features of apparatus and methods that are described herein and/or any other suitable device or approach.

An enterprise may maintain multiple different customer-facing channels, each relying on different technologies. Different channels may include different levels of security.

For example, a mobile application may require biometric authentication. Within the mobile application, a customer may feel secure that they are interacting with legitimate enterprise representatives. However, a telephone communication typically does not provide any way for an agent to authenticate themselves as a legitimate representative.

It would be desirable to provide a system for leveraging more secure channels such as a mobile device application for reverse authentication of a telephone communication. However, linking multiple communication channels in real time presents a number of technical challenges.

One challenge involves integrating the mobile device application with multiple different telephone applications and technologies. For example, customer-facing agents in a financial institution call center may use a different system from agents in a fraud prevention department or agents making calls from a banking center.

The system may include a real-time call monitoring plug-in that may add functionalities to different customer-facing telephone applications. The plug-in may operate across contact centers and across financial center technology. In most cases, agents initiate calls through telephone application software so the plug-in functionalities may engage automatically. In cases where a telephone call is initiated manually, the call may be captured by the telephone application through a call-in feature.

The plug-in functionalities may detect when an agent initiates or answers a call. The plug-in may publish events to a central real-time monitoring application. For example, the plug-in may publish an event when the call starts and when the call ends.

The plug-in may publish an agent identifier associated with the call. The agent identifier may include an identification code, a name, a department, or any suitable information. The plug-in may publish a customer identifier associated with the call. The customer identifier may include an identification code, a name, an account number, or any suitable information.

The system may include a real-time monitoring application. The real-time monitoring application may be hosted on a central server. The central server may be a deep back-end enterprise server. The real-time monitoring application may maintain active call information in a queue associated with a customer identifier. The queue may be maintained for the duration of the call. The queue may be maintained for a predetermined time period following termination of the call. The time period may be adjusted by a system administrator.

The real-time monitoring application may use the agent identifier to retrieve additional agent information. For example, the plug-in may publish an agent identification code. The system may use the code to retrieve a name or department for the agent.

The system may include a secure mobile device application. A customer may authenticate an enterprise caller through an enterprise mobile device application.

The system may include a web servicing application. The web servicing application may be a server-based intermediary serving front end channels. The web servicing application may act as a gateway between the mobile device and back-end enterprise systems. The gateway may be an internal enterprise application that exposes web services to the mobile application. The gateway may provide user authentication and protection for enterprise systems.

The mobile device application may access the web servicing application. In some embodiments, the mobile application may use a WebSocket connection to access the web servicing application. WebSocket protocols may enable interaction between a client application and a web server using a bidirectional binary protocol. A protocol handshake may pass data to an application using Hypertext Transfer Protocol (HTTP) and may enable a server to manage HTTP and WebSocket connections on the same port. WebSocket communication protocols are typically used for chat functions.

In some embodiments, the web servicing application may be a java-based representational state transfer (REST) application. REST is a software architecture that defines the constraints to create web services.

The web servicing application may provide web services or WebSocket services to mobile application. The web servicing application may include functionalities for interfacing with data related to transfers, deposits, or accounts. Functionalities for interfacing with data related to real-time call monitoring may be added as an additional component to an existing web servicing framework.

The web servicing application may interact with the real-time monitoring application. The web servicing application may use the customer identifier associated with mobile application. The web servicing application may access an event queue associated with the customer identifier. The web servicing application may determine that the event queue includes an active call or recently concluded call and may push call status information to the mobile application.

The web servicing application may use a subscriber model. As part of the initial status inquiry, the web servicing application may subscribe to the real-time monitoring application queue. The web servicing application may receive a notification of events occurring after the subscription, such as termination of a call, and then push the information to the mobile application.

The mobile application may display active call data in any suitable format. For example, a phone icon may appear in the corner of a display screen. The phone icon may be shown in a particular color to indicate an active call or a recently completed call. Selecting the phone icon may display the name of the agent. Additional information that may be displayed may include a department or product associated with the call. In another illustrative example, a banner within the mobile application display may indicate that a call is in progress. The banner may include any other suitable information associated with the call.

In some embodiments, a customer may use a mobile application chat interface to communicate an inquiry regarding an active call. The customer may communicate with a live agent or with an interactive response system. The interactive response system may include a chatbot. Chatbots are software used to automate conversations and interact with humans through various communication platforms. Chatbots may be powered by pre-programmed responses, AI and/or machine learning in order to answer questions without involving a human agent. Chatbots may simulate conversations with a human using text, text-to-speech, or speech-to-speech.

A customer may inquire about the legitimacy of an active call. The interactive response system may communicate with the web services application to identify an active call. The interactive response system may communicate information about an active call to the customer.

One or more non-transitory computer-readable media storing computer-executable instructions are provided. When executed by a processor on a computer system, the instructions perform a method for integrating real-time communication across multiple enterprise channels.

The method may include, at a telephone application, publishing an event associated with an active call to a real-time monitoring application. The event may be associated with an agent identifier and a customer identifier.

The method may include, at the real-time monitoring application, maintaining an event queue for the active call. The event queue may be associated with the customer identifier.

The method may include, at a web services application, subscribing to the event queue at the real-time monitoring application and pushing a call status to a mobile device application.

The method may include, at the mobile device application, displaying the call status and the agent identifier to the customer.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods. Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server," or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

Memory 115 may be comprised of any suitable permanent storage technology, such as a hard drive. Memory 115 may store software including the operating system 117 and application program (s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program (s) 119, which may be used by computer 101, may include computer executable instructions for invoking functionality related to communication, such as e-mail, Short Message Service (SMS), and voice input and speech recognition applications. Application program (s) 119 (which may be alternatively referred to herein as "plugins," "applications," or "apps") may include computer executable instructions for invoking functionality related to performing various tasks. Application program (s) 119 may utilize one or more algorithms that process received executable instructions, perform power management routines or other suitable tasks. Application program (s) 119 may utilize one or more decisioning processes for the processing of real-time communications as detailed herein.

Application program (s) 119 include may computer executable instructions (alternatively referred to as "programs"). The computer executable instructions may be embodied in hardware or firmware (not shown). The computer 101 may execute the instructions embodied by the application program (s) 119 to perform various functions.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

The invention may be described in the context of computer-executable instructions, such as application (s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
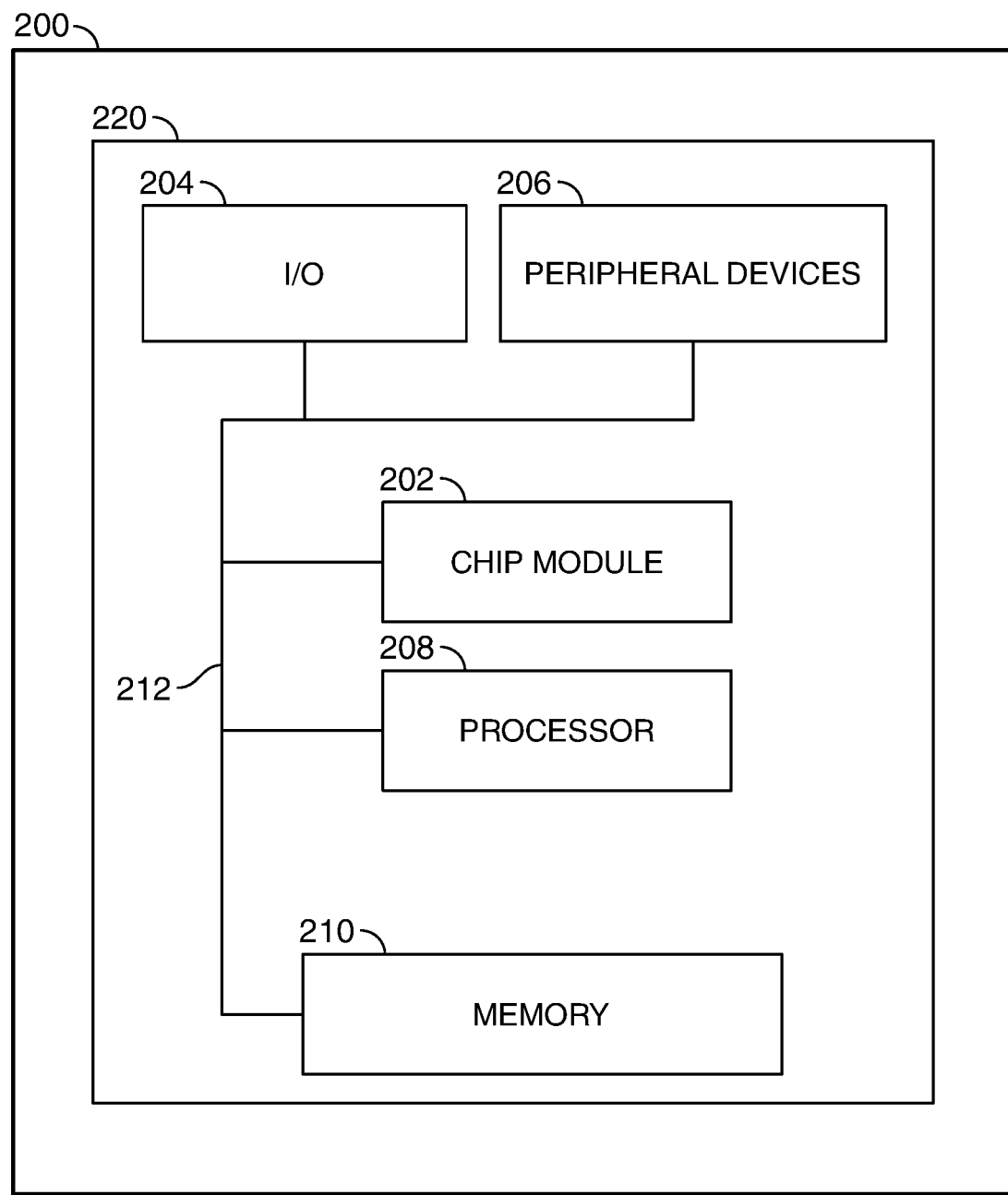
FIG. 2 shows illustrative apparatus in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208, and 210 may be coupled together by a system bus or other interconnections 212 and may be present on one or more circuit boards such as circuit board 220. In some embodiments, the components may be integrated into a single chip. The chip may be silicon-based.

Figure 3:
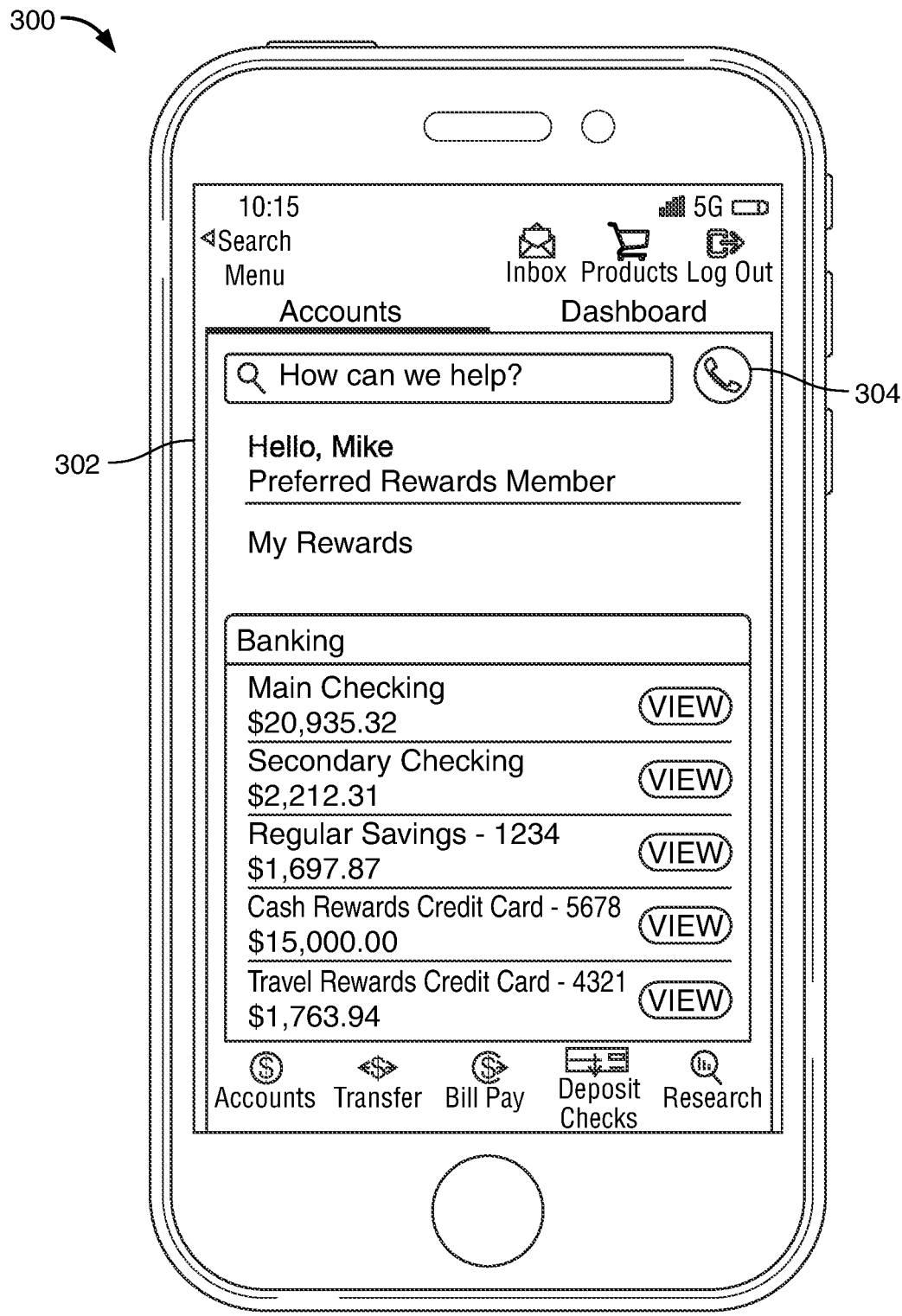
FIG. 3 shows an illustrative screen view in accordance with principles of the disclosure.

FIG. 3 shows illustrative screen view 300. Illustrative screen view 300 shows account view 302 for a financial institution mobile device application. The account view may include active call icon 304. Icon 304 may verify that a legitimate representative of the financial institution is engaged in a telephone call with the customer.

Figure 4:
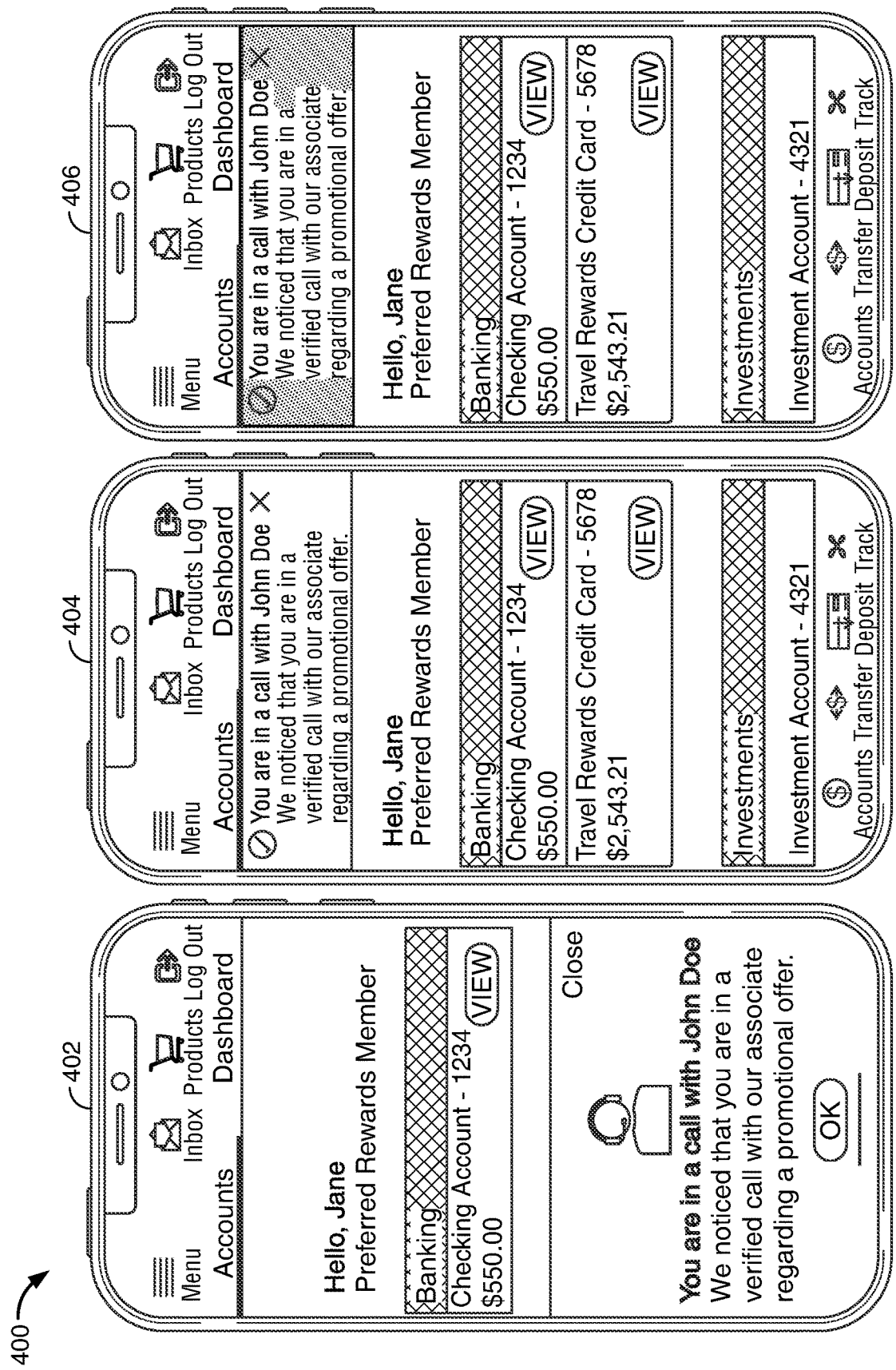
FIG. 4 shows a set of illustrative screen views in accordance with principles of the disclosure.

FIG. 4 shows illustrative screen views 400. Illustrative screen views 400 include account views 402-406 for a financial institution mobile device application. Each account view shows a pop-up banner that conveys information about an active call. In some embodiments, the banner may appear in response to selection of an active call icon such as icon 304, shown in FIG. 3. Various illustrative designs are shown, but any suitable display may be used.

Figure 5:
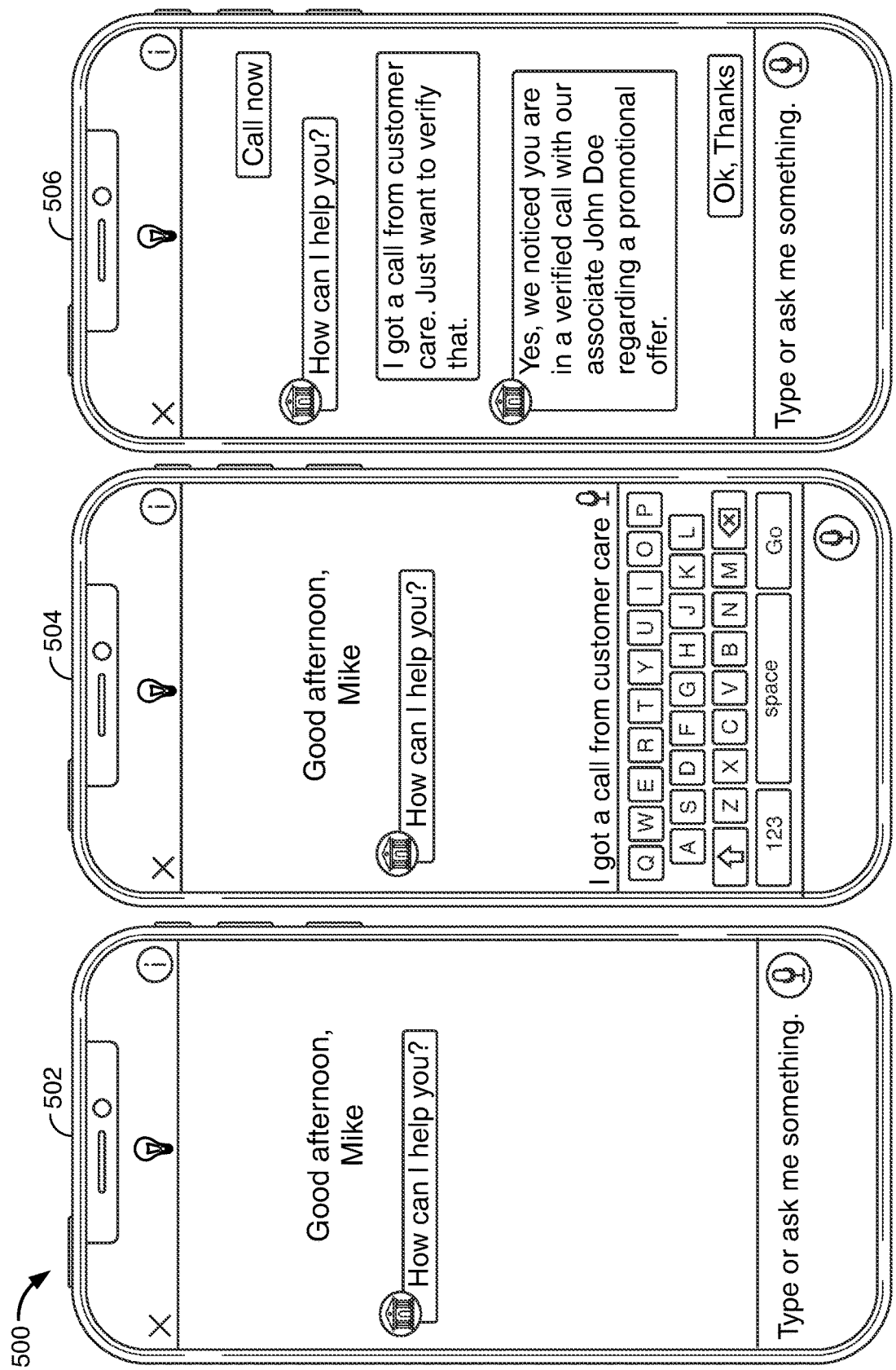
FIG. 5 shows a set of illustrative screen views in accordance with principles of the disclosure.

FIG. 5 shows illustrative screen views 500. Illustrative screen views 500 include electronic chat communications at a mobile device application. At 502, a mobile device screen shows that a chat function is initiated. At 504, the mobile device screen includes a pop-up virtual keyboard to receive input from a user. In the illustrative view shown at 504, a customer has begun to type a question about a telephone call from the financial institution. At 506, the customer receives a response verifying that the call is legitimate. The illustrative response shown includes an agent name and a topic for the call, but any combination of information may be provided for verification.

Figure 6:
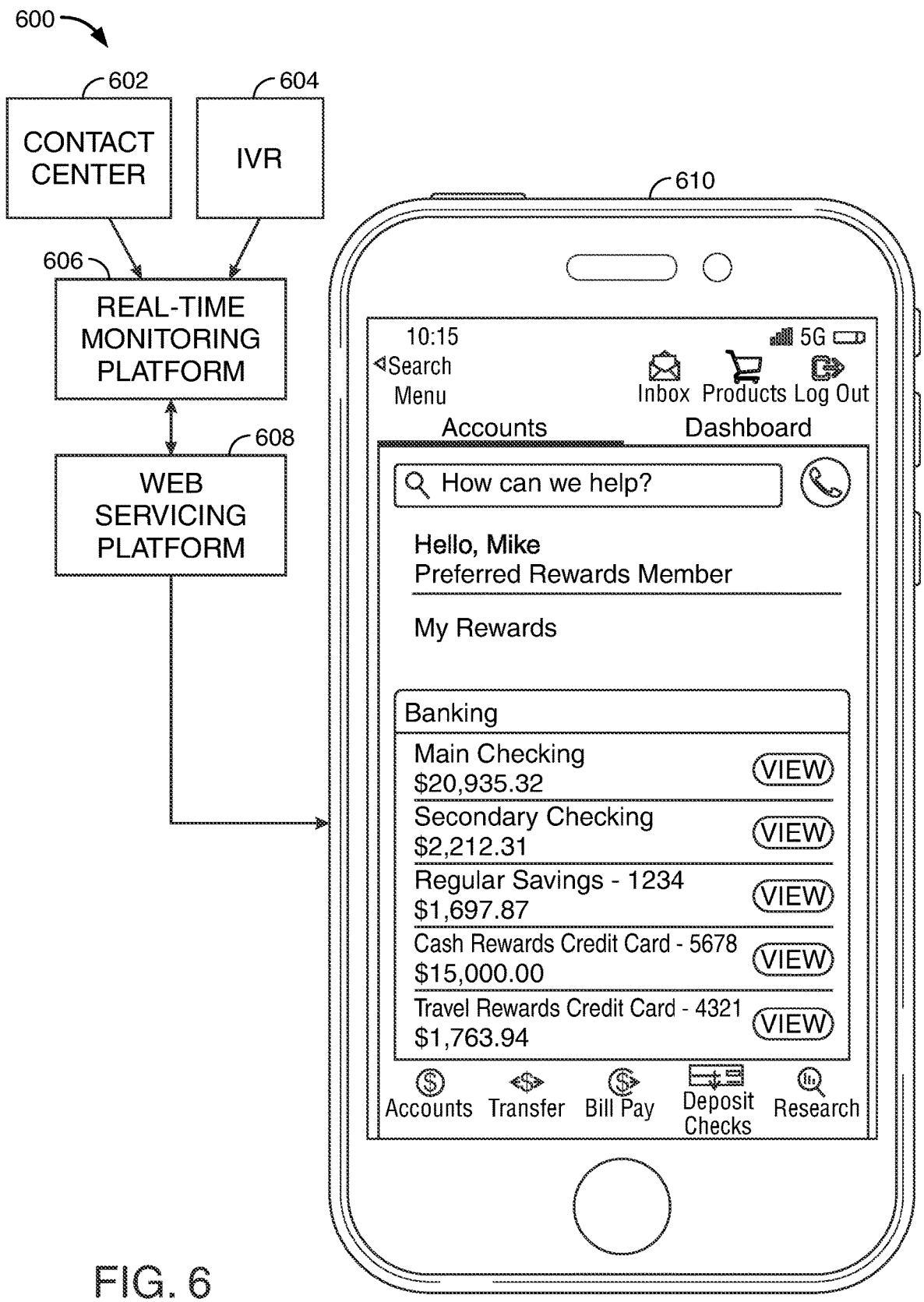
FIG. 6 shows an illustrative process flow in accordance with principles of the disclosure.

FIG. 6 shows illustrative process flow 600. Process flow 600 includes front-end and back-end architecture for integrating a customer-facing telephone application and a customer-facing mobile device application.

At 602-604, a telephone call between an agent and a customer is initiated. The agent may be a live agent or a virtual agent (bot). Illustrative telephone systems include call center 602 and interactive voice response system 604. A plug-in application may be applied to a variety of different telephone systems.

At 606, the telephone system plug-in may publish events to a real-time monitoring platform. The real-time monitoring platform may be server based. Illustrative events may include call initiation and call termination. Each event may be associated with an agent identifier and a customer identifier.

At 608, a web servicing platform may access the real-time monitoring platform. The web servicing platform may be server based. The web servicing platform may access a call status using a customer identifier. The web servicing platform may subscribe to an event queue maintained by the real-time monitoring platform in association with the customer identifier.

At 610, call status updates may be pushed to a mobile device application and displayed to the customer.

Figure 7:
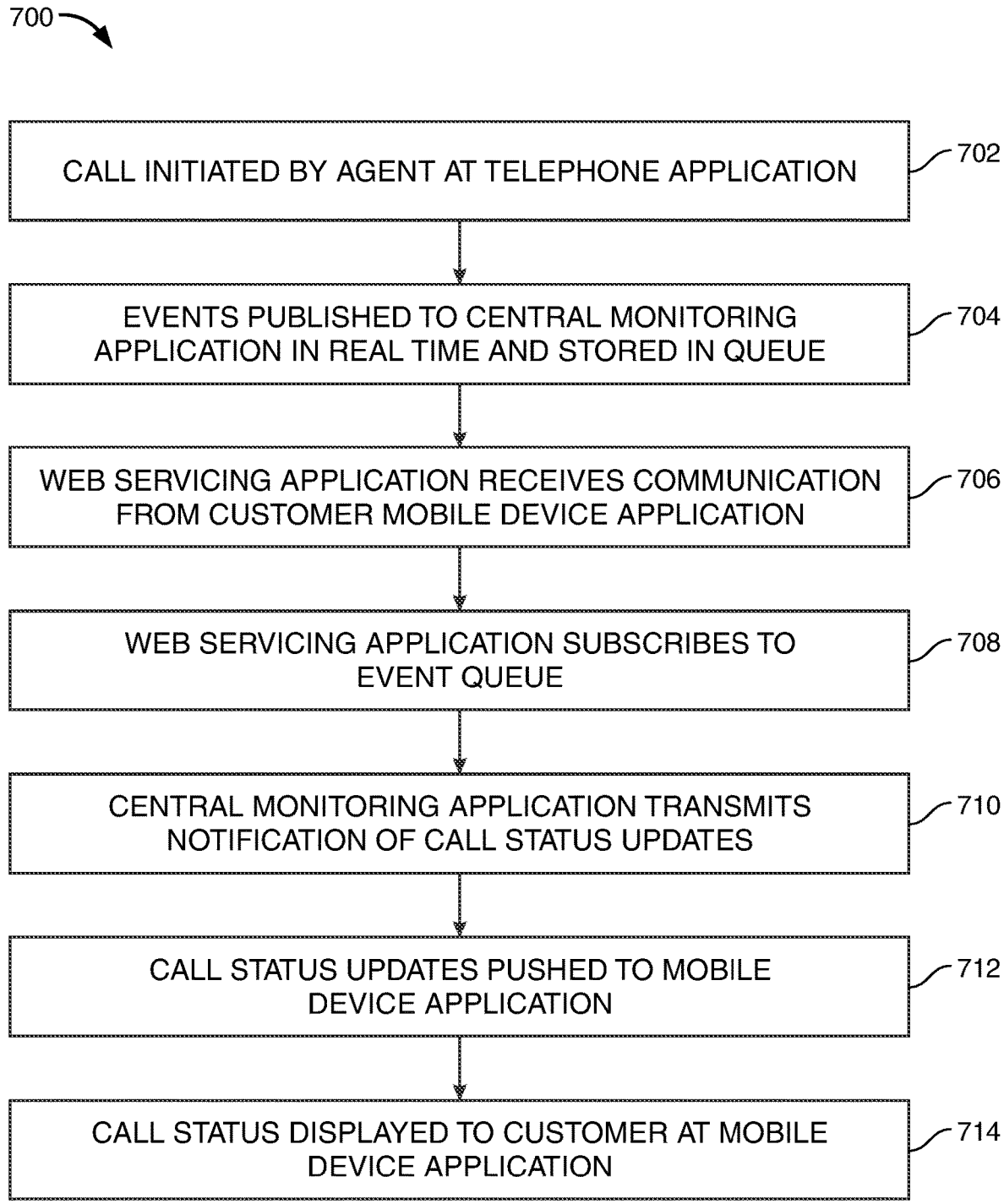
FIG. 7 shows an illustrative process flow in accordance with principles of the disclosure.

FIG. 7 shows illustrative process flow 700 for integrating a customer-facing telephone application and a customer-facing mobile device application. Elements of process flow 700 may correspond to process flow 600, shown in FIG. 6.

At step 702, a telephone call between an agent and a customer is initiated. A plug-in application may be applied to a variety of different telephone systems.

At step 704, the telephone system plug-in may publish events to a central monitoring application in real time. Each event may be associated with an agent identifier and a customer identifier. The central monitoring application may maintain an event queue associated with the customer identifier.

At step 706, a web servicing application may receive a communication from a customer mobile device application. The communication may be triggered by a secure login by the customer. At step 708, the web servicing application may check call status and subscribe to the event queue. At step 710, the central monitoring application may notify the web servicing application of an update to the event queue, such as termination of the call.

At step 712, the web servicing application may push the update to the mobile device application. At step 714, call status may be displayed at the mobile device application.

Thus, methods and apparatus for REAL-TIME CROSS-CHANNEL REVERSE AUTHENTICATION are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for integrating real-time communication across multiple enterprise channels to reverse authenticate a telephone caller, the method comprising:
    at a client processor comprising an enterprise call application:
        initiating an active call from an enterprise agent to a customer at a first customer interface having a first level of authentication; and
        publishing an event associated with the active call to an event queue at a real-time monitoring application, the event comprising an agent identifier associated with the enterprise agent and a customer identifier associated with the customer;

at a central server comprising the real-time monitoring application, maintaining the event queue for the active call, the event queue associated with the customer identifier;

at a web services application configured to interface between the central server and a mobile device, subscribing to the event queue at the real-time monitoring application and pushing a call status for the active telephone call to a second customer interface comprising a mobile device application having a second level of authentication; and at the mobile device, displaying the call status for the active telephone call and the agent identifier at the mobile device application.

2. The method of claim 1, wherein:
the published event comprises a call termination; and
the mobile device application is configured to display a completed call status.

3. The method of claim 2, wherein the real-time monitoring application is configured to maintain the event queue for a predetermined period following publication of the call termination.

4. The method of claim 1, wherein:
the published event comprises a department identifier and a financial product identifier; and
the mobile device application is configured to display a department and financial product associated with the active call.

5. The method of claim 1, wherein:
the real-time monitoring application is configured to retrieve an agent name associated with the agent identifier; and
the mobile device application is configured to display the agent name.

6. The method of claim 1, wherein the web services application is configured to subscribe to the real-time monitoring application event queue in response to a query from the mobile device application.

7. The method of claim 1, wherein the web services application is a java-based representational state transfer (REST) application, configured to interface between a front-end mobile application and a back-end real-time monitoring center.

8. One or more non-transitory computer-readable media storing computer-executable instructions which, when executed by a processor on a computer system, perform a method for integrating real-time communication across multiple enterprise channels, the method comprising:
at a telephone application: and
initiating an active call from an enterprise agent to a customer at a first customer interface having a first level of authentication; and
publishing an event associated with the active call to a real-time monitoring application, the event comprising an identifier associated with the enterprise agent and an identifier associated with the customer;
at the real-time monitoring application, maintaining an event queue for the active call, the event queue associated with the customer identifier;
at a web services application, subscribing to the event queue at the real-time monitoring application and pushing a call status for the active call to a second customer interface comprising a mobile device application having a second level of authentication; and
at the mobile device application, displaying the call status and the agent identifier.

9. The media of claim 8, wherein:
the published event comprises a call termination; and
the mobile device application is configured to display a completed call status.

10. The media of claim 9, wherein the real-time monitoring application is configured to maintain the event queue for a predetermined period following publication of the call termination.

11. The media of claim 8, wherein:
the published event comprises a department identifier and a financial product identifier; and
the mobile device application is configured to display a department and financial product associated with the active call.

12. The media of claim 8, wherein the web services application is configured to subscribe to the real-time monitoring application event queue in response to a query from the mobile device application.

13. The media of claim 8, wherein:
the real-time monitoring application is configured to determine an agent name associated with the agent identifier; and
the mobile device application is configured to display the agent name.

14. A system for integrating real-time communication across multiple enterprise channels for reverse authentication of a telephone call, the system comprising:
a client processor comprising a customer-facing telephone application;
a mobile device comprising a customer-facing mobile application;
a central server comprising a real-time monitoring application; and
a web services application configured to interface between the mobile device and the central server;
wherein:
the telephone application is configured to publish one or more events associated with an active call to the real-time monitoring application;
the real-time monitoring application is configured to maintain an event queue associated with the active call;
the web services application is configured to subscribe to the event queue at the real-time monitoring application and push a call status to the mobile application; and
the mobile application is configured to display the call status at a mobile device display.

15. The system of claim 14, the events comprising a call initiation and a call termination, each event associated with a customer identifier associated with a customer receiving the active call and an agent identifier associated with an agent initiating the active call.

16. The system of claim 15, the real-time monitoring application configured to maintain an event queue for a predetermined period following publication of a call termination.

17. The system of claim 14, the event queue associated with a customer identifier.

18. The system of claim 14, the mobile application requiring biometric authentication.

19. The system of claim 14, the telephone application comprising a plug-in configured to publish the events to the real-time monitoring application, the plug-in configured to interface with a plurality of different telephone applications.

20. The system of claim 14, the web services application comprising a java-based representational state transfer gateway, configured to interface between a front-end mobile application and a back-end real-time monitoring application.

\* \* \* \* \*